United States Patent
Wietelmann et al.

(10) Patent No.: US 12,221,698 B2
(45) Date of Patent: Feb. 11, 2025

(54) PROCESS FOR THE PREPARATION OF LITHIUM METAL AND LITHIUM ALLOY MOULDINGS

(71) Applicant: ALBEMARLE GERMANY GMBH, Frankfurt am Main (DE)

(72) Inventors: Ulrich Wietelmann, Friedrichsdorf (DE); Dirk Dawidowski, Friedberg (DE)

(73) Assignee: ALBEMARLE GERMANY GMBH, Frankfurt am Main (DE)

( * ) Notice: Subject to any disclaimer, the term of this patent is extended or adjusted under 35 U.S.C. 154(b) by 95 days.

(21) Appl. No.: 18/007,607

(22) PCT Filed: Jun. 3, 2021

(86) PCT No.: PCT/EP2021/064921
§ 371 (c)(1),
(2) Date: Dec. 1, 2022

(87) PCT Pub. No.: WO2021/245196
PCT Pub. Date: Dec. 9, 2021

(65) Prior Publication Data
US 2023/0220555 A1    Jul. 13, 2023

(30) Foreign Application Priority Data
Jun. 4, 2020   (DE) .................. 10 2020 114 839.9

(51) Int. Cl.
| H01M 4/04 | (2006.01) |
| C22B 26/12 | (2006.01) |
| C23C 18/08 | (2006.01) |
| H01M 4/66 | (2006.01) |

(52) U.S. Cl.
CPC .............. *C23C 18/08* (2013.01); *C22B 26/12* (2013.01); *H01M 4/0404* (2013.01); *H01M 4/661* (2013.01)

(58) Field of Classification Search
CPC ...................................................... H01M 4/04
See application file for complete search history.

(56) References Cited

U.S. PATENT DOCUMENTS

| 4,206,191 A | 6/1980 | Morrison et al. | |
| 4,446,215 A | 5/1984 | Badoz et al. | |
| 4,668,593 A * | 5/1987 | Sammells | H01M 10/36 429/231.5 |
| 4,780,380 A * | 10/1988 | Prater | H01M 4/12 429/201 |
| 5,601,623 A * | 2/1997 | Fauteux | H01M 10/0565 204/278 |
| 6,756,024 B2 | 6/2004 | Weiss et al. | |
| 6,994,800 B1 | 2/2006 | Gordon et al. | |
| 9,073,120 B2 | 7/2015 | Wietelmann | |
| 2008/0237538 A1 | 10/2008 | Archer et al. | |
| 2020/0099039 A1 | 3/2020 | Kaskel et al. | |

FOREIGN PATENT DOCUMENTS

| DE | 102017208218 A1 | 11/2018 |
| EP | 1238944 A1 | 9/2002 |
| GB | 642034 A | 8/1950 |
| WO | 2011073324 A1 | 6/2011 |

OTHER PUBLICATIONS

Benoit, F .; "Contribution à l'ètude du lithium-ammonium"; Bulletin De La Sociètè Chimique De France; Bureaux De La Sociètè: 44 Rue De Rennes; (1923) 908-917; 11 pages, not translated.
Bronn, J.; "Liquified ammonia as solvent"; Materials about the chemical properties of the liquefied ammonia gas collected; Vertag bon Julius Springer; Berlin; Dec. 31, 1905; pp. 116-117; Translation 6 pages.
Hollemann, Wiberg, "Organic compounds of the alkali metals"; 102nd ed., De Gruyter Verlag Berlin 2007, p. 1296; Translated 3 pages.
Jaffe, H.; "A metallic compound of lithium with ammonia. Electrical conductivity and galvanomagnetic effects"; . Z. Phys. 93, 1935, 741-761.
Johnson, W.C. et al.; "The Solubility of Metallic Lithium in Liquid Ammonia at Low Temperatures"; , M. M. Piskur, J. Phys. Chem. 37 (1933) 93-99.
Liu, Jun et al.; Pathways for practical high-energy long-cycling lithium metal batteries; Perspective; Nature Energy; vol. 4; , Mar. 2019; pp. 180-186.
Mel'nikova, V.I. et al.; :New Method for the Selective Reduction of Unsaturated Ketones; J. Org. Chem. USSR 6, 1970; p. 2635.
Müller, Richard H. et al.; "Lithium Bronze as a Stoichiometric Reagent for the Conjugate Rejuction of α,β-Unsaturated Ketones"; J. Org. Chem. vol. 43; No. 24; 1978; pp. 4647-4648.
Zurek, Eva; "A Molecular Perpective on Lithium-Ammonia Solutions"; C26Angew. Chem. Int. Ed. 2009, 48, 8198-8232.

* cited by examiner

*Primary Examiner* — Austin Murata
(74) *Attorney, Agent, or Firm* — KDW Firm PLLC

(57) ABSTRACT

The invention relates to a process for the production of lithium metal and lithium alloy mouldings, wherein solutions of metallic lithium in ammonia having the composition $Li(NH_3)_{4+n}$ and n=0-10 are brought into contact with metallic or electronically conductive deposition substrates and the ammonia is removed at temperatures of −100 to 100° C. by overflowing with inert gas or at pressures of 0.001 to 700 mbar, so that the remaining lithium is deposited on the deposition substrate or/and it is doped with lithium or alloyed by it.

13 Claims, No Drawings

PROCESS FOR THE PREPARATION OF LITHIUM METAL AND LITHIUM ALLOY MOULDINGS

REFERENCE TO RELATED APPLICATIONS

This application is the National Stage of International Patent Application No. PCT/EP2021/064921, filed on Jun. 3, 2021, which application claims priority from German Patent Application No. 10 2020 114 839.9, filed Jun. 4, 2020, the disclosures of which are incorporated herein by reference.

The invention relates to a process for the production of lithium metal and lithium alloy mouldings (bodies), especially substrates coated or doped with metallic lithium for use as anodes in galvanic cells.

BACKGROUND

Solutions of alkali metals, especially metallic lithium in liquid ammonia, have long been known (e.g., W. C. Johnson, M. M. Piskur, J. Phys. Chem. 37 (1933) 93-99). On cooling such saturated solutions to <−60° C., phase separation occurs and a bronze-metallic liquid layer having the composition $Li(NH_3)_4$, so-called Li bronze, forms over a dilute blue solution (H. Jaffe, Z. Phys. 93, 1935, 741-761). The Lithium/ammonia system is described in detail in R. Hoffmann et al, Angew. Chem. Int. Ed. 2009, 48, 8198-8232.

Solutions of alkali metals, for example lithium, in ammonia are metastable and decompose thermally according to

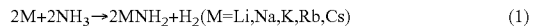

$$2M + 2NH_3 \rightarrow 2MNH_2 + H_2 (M=Li,Na,K,Rb,Cs) \qquad (1)$$

with formation of the metal amides (R. Hoffmann et al., Angew. Chem. Int. Ed. 2009, 48, p. 8202). Decomposition proceeds extremely slowly in the absence of water and oxygen. However, a number of transition metals (e.g. $Fe^{2+}$) catalyze the decomposition reaction that takes place under hydrogen evolution (Hollemann, Wiberg, "Lehrbuch der Anorganischen Chemie", 102nd ed., De Gruyter Verlag Berlin 2007, p. 1296). From investigations of the vapor pressure isotherms of a compound having the composition $Li_2(NH_3)_8$ (dimeric lithium bronze), it is deduced that, in addition to decomposition to the metal amide according to Eq. (1), there may be also a temperature-dependent dissociation equilibrium according to

$$Li_2(NH_3)_8 \leftrightarrows 2Li + 8NH_3 \qquad (2)$$

(F. Benoit, BI. Soc. Chico. 33 (1923) 908-917).

U.S. Pat. No. 4,206,191 A describes a method for the preparation of lithium amide, wherein a mixture of lithium metal, a liquid aromatic solvent (toluene), anhydrous liquid ammonia and a metal catalyst (finely divided metallic cobalt) to increase the rate of formation of the lithium ammonia compound is reacted at low temperatures (0° C. to −60° C. or lower) with stirring to form a lithium ammonia solution, which is then converted to a finely divided dispersion of lithium amide in ammonia by raising the temperature to room temperature up to 60° C.

US 2008/0237538 A1 teaches how to prepare lithium bronze in the presence of an organic solvent, for example THF, at temperatures below −33° C. (the boiling temperature of $NH_3$ at normal pressure) and to convert it to lithium amide in the presence of hydrogen acceptors (a 1,3-diene or an aryl olefin such as styrene) in the subsequent step by thermal decomposition with hydrogen evolution.

Furthermore, it is known that lithium bronze can be prepared at room temperature by reacting lithium pieces in dry ether and obtained in pure form by phase separation using a separating funnel (V. I. Mel'nikova, K. K. Pivnitskii, J. Org. Chem. USSR (Engl. Transl.), 6, 2635, 1970).

EP 1 238 944 A1 describes the preparation of lithium bronze from lithium granules and ammonia gas in hexane suspension at room temperature (RT).

Finally, bronze formation at room temperature in the absence of solvents from lithium wire and ammonia gas has been reported (R. H. Müller, J. G. Gillick, J. Org. Chem. 43 (1978) 4647-8).

The lithium batteries currently available on the market function according to the intercalation principle. A graphite material with a maximum capacity of 372 mAh/g (corresponding to the formula $LiC_6$) is used as the anode. Higher capacities and thus energy densities can be achieved by partial or complete replacement of graphite by alloying materials (for example silicon or tin, "alloy anode materials") or by complete replacement of graphite materials by metallic lithium.

Lithium metal has an extremely high electrochemical capacity of 3862 mAh/g. Since common cathode materials have a much lower capacity (from only 150 to 300 mAh/g), this results in very low area-specific loadings of <10 mAh/g for the Li metal-based anode side for a balanced battery cell (i.e. one with a ratio between negative and positive mass, NIP, close to 1). This corresponds to Li film thicknesses of 5 to 20 µm. However, today's commercial films produced by extrusion, possibly followed by a rolling process, are only available up to layer thicknesses of 50 µm, at best 30 µm. When 50 µm lithium foil is used, NIP ratios of 50 and above are present. This unnecessarily high lithium input reduces the energy density (by far the most lithium is not used electrochemically and therefore forms an inactive, "dead" mass). Furthermore, the unnecessarily high input of metallic lithium represents an avoidable cost factor and it worsens the safety characteristics of such battery cells due to its high reactivity (J. Liu et al., Nature Energy 4, 180, 2019; P. Shi et al., Adv. Mater. Technol. 2020, 5, 1900806).

For the production of the thin lithium electrodes required for future lithium metal accumulators, it is therefore necessary to resort to unfavorable, cost-intensive processes, mostly PVD (plasma vapor deposition) techniques, or to processes operating at higher temperatures (e.g. lithium fusion deposition on current collectors at >180° C.).

OBJECT

The present invention aims to provide a low-cost process, feasible under mild conditions and scalable, for the production of lithium metal-containing mouldings (bodies/impressions), for example of lithium or lithium alloy foils.

DESCRIPTION OF THE INVENTION

The process according to the invention is carried out in such a way that solutions of metallic lithium in ammonia having the composition $Li(NH_3)_{4+n}$ and n=0 to 10 are brought into contact with metallic or electronically conductive deposition substrates and the ammonia is removed at temperatures of −100 to 100° C. by overflowing with inert gas or at pressures of 0.001 to 700 mbar, so that the remaining lithium is deposited on the deposition substrate or/and it is doped with lithium or alloyed by it.

The lithium metal and lithium alloy mouldings (bodies/impressions) according to the invention are prepared in the absence of transition metal-containing catalysts or hydrogen acceptors by thermal decomposition of a solution of pure metallic lithium in ammonia, preferably of pure liquid lithium bronze (Li(NH$_3$)$_4$), at temperatures of at maximum 100° C., preferably at maximum 60° C. and particularly preferably at maximum 40° C., and in contact with deposition substrates. In this process, ammonia is completely removed via the gas phase in reversal of the formation reaction, so that elemental Li metal remains, which is deposited on the surfaces of the apparatus used and deposition substrates located therein. The deposition substrates are, in particular, metallic or only electronically conductive bodies in forms such as powders, granules, foils, sheets or three-dimensional bodies with hollow structures, for example sponges. Lithium deposition can be purely physical (e.g. on metals that cannot be alloyed with lithium, such as copper, iron or nickel), but it can physico-chemical also reach the "inner volume" of the materials (e.g. in the case of sponge-like substrates or certain carbon materials such as graphites, graphene, etc.) or also involve an alloy-forming reaction (e.g. in the case of lithium-alloyable deposition substrates consisting of silicon, germanium, tin, boron, aluminum, magnesium, antimony, etc.).

Surprisingly, it was found that, contrary to the usual doctrine, decomposition to lithium amide is largely absent when the process conditions described in more detail below are observed, and instead pure metallic lithium is generated.

Since lithium bronze, with a Li:NH$_3$ molar ratio of 1:4, contains the lowest ammonia-content and therefore requires the least ammonia for production, this compound is the ideal starting material for the process according to the invention:

$$\text{Li(NH}_3)_4 \rightarrow \text{Li}° + 4\text{NH}_3 \uparrow \quad (3)$$

If, on the other hand, the blue solutions of lithium in ammonia having the composition Li(NH$_3$)$_{4+n}$ are used, the superstoichiometric ammonia (n mole equivalents) is first removed until the most concentrated liquid form—the Li bronze—is obtained. As the ammonia content increases, the process efficiency is degraded and the amount of the undesirable lithium amide-forming decomposition reaction is increased. For these reasons, dilute solutions of lithium in liquid ammonia can be used in principle, but the use of lithium bronze is preferred for the sake of an economical process.

The process is preferably carried out under reduced pressure, i.e. in the pressure range from 0.001 to 700 mbar. Alternatively, the ammonia can also be removed by passing an inert gas stream over it. Since the ammonia concentration is reduced by the stripping gas and the recovery of ammonia is more difficult, this process is generally less cost-effective than the vacuum process.

The lithium source used is commercially available technical lithium metal or, preferably, a purer battery or alloy grade. Such metal grades are available, for example, from Sigma-Aldrich-Fluka (SAF). For example, there is a 99% "high sodium" technical grade with metal impurities of a maximum of 15,000 ppm, with sodium taking by far the highest proportion. Transition metals (especially Fe, Ag, Cu, Zn), on the other hand, are only present in the low ppm range (1-20 ppm). The sum of transition metal impurities is usually in the range of 100 ppm and below. Furthermore, SAF offers lithium in battery quality, i.e. a Li content (based on metallic trace elements) of 99.9%. Such particularly pure battery quality contains a maximum of 1500 ppm other metal impurities, whereby sodium predominates in this case as well.

For the process according to the invention, metallic lithium with a cumulated transition metal impurity content of maximum 200 ppm, preferably maximum 100 ppm and particularly preferably maximum 50 ppm is used. Impurities with main group metals, in particular metals of the alkali and alkaline earth metals and of the boron and carbon groups (13th and 14th groups), on the other hand, do not in principle interfere with the process. They can therefore also be present in larger amounts, i.e. up to the percentage range.

A particular advantage of the process according to the invention is that even lithium metal grades of low purity with correspondingly high contents of transition metal elements can be used after a simple pretreatment. In this case, the thermally induced dissociation process is preceded by a simple filtration, centrifugation and/or decantation step. Since transition metals, especially iron, are largely insoluble in liquid ammonia and do not form ammoniate compounds, they remain in solid form and can therefore be separated from the ammonical lithium solution or the lithium bronze, respectively, by a solid/liquid separation step. This prepurification step can be carried out with respect to temperature throughout the liquid range of the lithium-ammonia solution used. In the case of lithium bronze, this is between −185° C. and approx. 70° C. A temperature range between −40° C. and 40° C. is preferred. If a filter is used, the preferred pore size is a maximum of 10 μm, preferably a maximum of 2 μm and particularly preferably a maximum of 0.5 μm. The total (cumulated) content of transition metal elements in the lithium ammonia composition purified as described is a maximum of 200 ppm, preferably a maximum of 100 ppm and particular preferably a maximum of 50 ppm, based on the lithium contained.

The thermal decomposition or dissociation of the lithium ammonia solutions and compounds, in particular of the defined lithium bronze, can take place either in the presence of an additional organic solvent (for example a hydrocarbon, ethers or amines) or without such additives. Since in the presence of solvents which are inert to lithium metal or at least kinetically stable, the released process heat of the ammoniate formation reaction can be dissipated more easily than without such additives, the presence of such liquid solvents represents a preferred embodiment of the invention. In particular, saturated hydrocarbons such as pentanes, hexanes, heptanes, octanes or common, commercially available mixtures of such compounds (technical "petroleum ethers", "white oils", "benzines") are suitable as solvents. Aromatic hydrocarbons can be used to a limited extent; since they can promote undesirable decomposition with lithium amide formation, aromatics are less preferred. The use of ethereal compounds such as diethyl ether, dibutyl ether, methyl tert-butyl ether, tetrahydrofuran, methyl tetrahydrofuran, tetrahydropyran, glymes and the like is also possible, but less preferred than the use of hydrocarbons. The reason for this is that lithium metal can react with ethereal compounds under unfavorable conditions with cleavage of the CO bond. This is a process that is only kinetically inhibited, but is highly exothermal. Accidents have been reported when using the lithium/THF system on an industrial scale. Therefore, cyclic ethers in principal are usable in principle, but are particularly unfavorable on an industrial scale. The volume of an organic solvent that may be used in the production of the defined lithium bronze is between 20 and 500% of the volume of lithium bronze.

Surprisingly, it was found that the use of pure lithium (i.e. lithium metal with a total transition metal content of not more than 200, preferably not more than 100, particularly preferably not more than 50 ppm) or of lithium/ammonia solutions or lithium bronze appropriately purified by solid/liquid separation, during subsequent thermal decomposition at mild temperatures of more than 100° C. and preferably under reduced pressure, produces a very pure, i.e. low-amide or amide-free lithium form. The lithium amide content relative to the total quantity of lithium deposited is at most 1% by weight, preferably at most 0.1% by weight.

Due to the high reactivity of metallic lithium and the $Li/NH_3$ mixtures, all process steps are carried out either under inert gas atmosphere (preferably argon, helium) or under vacuum conditions.

The process according to the invention is particularly suitable for the direct production of thin lithium layers on current conductor foils consisting of copper, iron, nickel, or special carbon morphologies such as carbon nanotube foils (CNT foils, CNT=carbon nanotubes) or graphene-based foils. Since some of the substrates in commercial form are poorly wetted by lithium, they may need to be pretreated. This pretreatment consists, for example, of removing any grease film that may be present by washing with organic, grease-dissolving solvents, cleaning with washing-active aqueous or/and mechanical cleaning processes such as grinding or polishing. In the case of copper, special lithiophilization processes, for example the application of a defined oxide layer by thermal pretreatment under oxidizing conditions, as described for example in DE 10 2017 208 218 A1, provide optimum results.

When lithium solutions in liquid ammonia or especially lithium bronze come into contact with metallic substrates M which are capable of alloying with lithium, corresponding alloys $Li_xM_y$, surprisingly form under mild conditions and with the release of ammonia. To form such alloy bodies, the desired metal M is added to the lithium bronze, preferably in powder or granule form. The added particles swell to form the alloy. After distillative separation of the ammonia, alloy materials containing lithium are obtained. Main group elements that can be alloyed with lithium, i.e. Be, Mg, Ca, Sr, Ba, B, Al, Ga, In, Si, Ge, Sn, Pb, Sb, Bi or any mixtures thereof, are particularly suitable for this alloy-forming process. Alloyable subgroup metals such as Zn, Ti or Zr can also be used, but it is sometimes difficult to avoid the undesirable amide formation.

The alloy powders produced in this way can be applied to current conductor foils by known purely mechanical pressing processes (calendering) or by means of dispersion binder processes ("slurry coating") and thus processed into anode bands.

The metallic lithium freshly deposited from lithium-$NH_3$ solutions in a vacuum or in an inert gas atmosphere is very reactive to air and moisture. To ensure its safe further processing in technical applications, e.g. the construction of battery cells, a passivation of the metal surface, i.e. the application of a thin protective layer, is a meaningful further process step. Such a process involves contacting with gaseous or liquid substances that form stable polymers and/or salts upon contact with lithium. Such a process is described, for example, in WO 2011/073324 A1.

The ammonia released during ammoniat dissociation can be liquefied in a plant and recycled or, preferably, used directly in gaseous form to form new lithium bronze. It is therefore possible to recycle the ammonia without energetically unfavorable liquefaction.

The lithium metal and lithium alloy mouldings are used for the production of anodes for lithium batteries, as metallic materials (preferably Li—Mg or Li—Al alloys), for getter purposes or in chemical synthesis.

The embodiments of the invention are summarized again below:

Process wherein the cumulated transition metal content of such solutions, based on contained lithium, is only up to 200 ppm.

Process wherein the total (cumulated) transition metal content of such solutions, based on contained lithium, is only up to 100 ppm.

Process wherein the ammonia is removed at temperatures ranging from −20 to 80° C.

Process in which the ammonia separation is carried out with the addition of an organic solvent selected from the group consisting of hydrocarbons, ethers or amines, the volume of the organic solvent in the case of the production of lithium bronze $Li(NH_3)_4$ being between 20 and 500% of the volume of lithium bronze.

Process wherein the organic solvent is a saturated hydrocarbon.

Process wherein metallic or only electronically conductive bodies in impressions such as powders, granules, foils, sheets or three-dimensional bodies with cavity structures are used as deposition substrates, the lithium deposition being carried out on non-lithium-alloyable metals selected from the group consisting of copper, iron, nickel or on carbon-based materials, physicochemically and/or as an alloy-forming process in the case of lithium-alloyable deposition substrates selected from the group consisting of silicon, germanium, tin, lead, boron, aluminum, magnesium or antimony.

Process wherein the carbon-based materials used are those based on carbon nanotubes or graphene.

Process wherein the lithium-alloyable deposition substrates have powders or granules of the alloying elements with an average particle size range of 0.1 mm to 5 cm.

Process wherein the solutions of lithium metal in ammonia are pre-cleaned by solid/liquid separation at temperatures from −185° C. to 70° C., preferably in the temperature range from −40° C. to 40° C.

Process wherein a filter is used whose pore size is in the range from 0.1 μm to 10 μm.

Process wherein lithium bronze $Li(NH_3)_4$ is used.

Process wherein surface passivation of the formed lithium-coated or -alloyed bodies is carried out by contacting with gaseous coating agents selected from the group consisting of $N_2$, $CO_2$, CO, $O_2$, $N_2O$, NO, $NO_2$, HF, $F_2$, $PF_3$, $PF_5$, $POF_3$ or liquid coating agents selected from carbonic acid esters; lithium chelatoborate solutions as solutions in organic solvents, organosulfur compounds, N-containing organic compounds, phosphoric acid, organic phosphorus-containing compounds, fluorine-containing organic and inorganic compounds, partially fluorinated hydrocarbons, $BF_3$, $LiPF_6$, $LiBF_4$ or silicon-containing compounds.

A process wherein the organic solvents are selected from the group consisting of oxygen-containing heterocycles, carbonic acid esters, nitrils, carboxylic acid esters or ketones and the organosulfur compounds are selected from the group consisting of sulfites, sulfones, sultones.

Process wherein coatings of metallic lithium on current collecting foils consisting of Cu, Fe, Ni or a carbon-based material are produced as lithium metal mouldings, the layer thickness of the applied lithium being in the range 2 to 40 μm, preferably 5 to 20 μm.

EXAMPLES

Example 1: Production of Lithium Bronze From Pure (Transition Metal-Poor) Lithium Metal In an inerted (i.e., dried and filled with Ar) ½ L double jacket glass reactor with a mechanical stirrer and a carbon dioxide snow cooler, 1.5 g (215 mmol) of Li granules (particle diameter 3 mm, Na-content=0.45%, Fe=26 ppm; Zn=2 ppm Cu=<10 ppm) were placed in 200 mL of technical hexane at room temperature. With good stirring, 22 L (920 mmol) of ammonia gas was then introduced within 3 hours. The reaction started after a few minutes, recognizable by the heat of solvation released and the discoloration of the lithium surface from silvery to bronze. The heat of reaction was dissipated by jacket cooling, so that the temperature of the reaction mixture was kept in the range between 18 and 30° C.

After all of the lithium had liquefied, converting to lithium bronze, the ammonia injection was terminated. The two liquid phases were separated by decantation and the upper light phase, i.e. the lithium bronze, was filled into an inerted glass bottle with septum closure.

Yield: 15.8 g (98% of theory bronze-colored liquid)

Example 2: Purification of Lithium Bronze

In a manner analogous to that described in Example 1, a lithium metal granulate with an iron content of 210 ppm was used. After complete reaction to $Li(NH_3)_4$, the bronze was separated by decantation and filtered through a membrane filter having a pore diameter of 0.45 μm.

The filtered product had the following analytics:

Li=13.2 mmol/g

Fe=2 ppm, corresponds to 0.04 μmol/g

This shows that the filtration step was able to remove 90% of the iron content introduced via the lithium raw material.

Example 3: Thermal Dissociation of Pure Li-Bronze in Vacuum 3.63 g (48.4 mmol) of pure lithium bronze from Example 1 was added to an inerted 50 mL glass Schlenk flask with a glass jacketed stirrer core. With good stirring, the flask was evacuated using a diaphragm pump. The liquid began to boil and splash. A silvery metallic film formed on the glass walls. After evacuation for 1 hour at 0.1 mbar at last, the vacuum was broken and replaced by argon. The mass of the non-evaporable residue was determined by weight difference measurement.

Result: 0.31 g (corresponds to 44.7 mol calculated as lithium, 92% of the theory)

Example 4: Deposition of a Lithium Metal Film on an Iron Sheet

A stainless steel sheet with dimensions 2×4×0.3 cm was cleaned mechanically using fine abrasive paper and degreased by rinsing with first acetone, then hexane. The plate was then immersed in Lithium bronze for about 10 s at normal ambient temperature. The thus wetted sheet was placed in a desiccator under exclusion of air and the ammonia was removed at first 500 mbar, then at full oil pump vacuum. In this way, an iron sheet partially coated with a thin, silvery lithium film was obtained. Since the steel surface was not completely lithiophilic, some areas were not wetted by the lithium bronze and were therefore not lithium coated.

Example 5: Production of a Lithium/Aluminum Alloy

In an inert 25 mL Schlenk flask with a glass-enclosed magnetic stirrer core were placed 2.9 g (39 mmol) pure lithium bronze from Example 1 and cooled to 0° C. using an ice bath. Then 0.61 g aluminum grit were added and stirred for 1 h at 0° C. After this time, the mixture was warmed to room temperature and the ammonia was removed in vacuo (last at 0.02 mbar).

Yield: 0.86 g of silver-appearing alloy (98% of the theory)

The invention claimed is:

1. A process for the production of lithium metal and lithium alloy moldings, characterized in that a solution of metallic lithium in ammonia having the composition $Li(NH_3)_4$ is brought into contact with metallic or electronically conductive deposition substrate and the ammonia from the $Li(NH_3)_4$ subsequently is removed at temperatures in the range of −20 to 80° C. by overflowing with inert gas or at pressures in the range of 0.001 to 700 mbar, so that the lithium from the $Li(NH_3)_4$ is deposited on the deposition substrate or/and the deposition substrate is doped with lithium or alloyed by it, wherein the deposition substrate onto which the lithium is deposited is metallic or only electronically conductive bodies in impressions such as powders, granules, foils, sheets or three-dimensional bodies with hollow structures are used, the deposition substrate onto which the lithium doping is carried out comprises one or more non-lithium-alloyable metals selected from the group consisting of copper, iron, nickel or onto carbon-based materials, physically or physicochemically, the deposition substrate alloyed by lithium comprises a lithium alloyable deposition material selected from the group consisting of silicon, germanium, tin, boron, aluminum, magnesium or antimony; and the deposition substrate is pre-treated to remove residual substances thereby allowing a homogenous layer of lithium to be deposited.

2. The process according to claim 1, characterized in that the cumulative transition metal content of the solution, based on contained lithium, is up to 200 ppm.

3. The process according to claim 2, characterized in that the cumulative transition metal content of the solution, based on contained lithium, is up to 100 ppm based on contained lithium.

4. The process according to claim 1, characterized in that the ammonia removal is carried out with the addition of an organic solvent selected from the group consisting of hydrocarbons, ethers and amines, the volume of the organic solvent being between 20 and 500% of the volume of lithium bronze Li(NH3)4 in the case of the preparation of the lithium bronze.

5. The process according to claim 4, characterized in that the organic solvent is a saturated hydrocarbon.

6. The process method according to any of claims 1 to 5, characterized in that the carbon-based materials comprise carbon nanotubes or graphene.

7. The process according to any of claims 1 to 5, characterized in that the lithium alloyable deposition material is powders or granules in the average particle size range of 0.1 mm to 5 cm.

8. The process according to any of claims 1 to 5, characterized in that a pre-cleaning of the solution of lithium metal in ammonia is carried out by solid/liquid separation at temperatures in the range of −185° C. to 70° C.

9. The process according to claim 8, characterized in that a filter is used whose pore size is in the range from 0.1 μm to 10 μm.

10. The process according to any of claims 1 to 5 claims 1 to 9, characterized in that lithium bronze Li(NH3)4 is used.

11. The process according to any of claims 1 to 5, characterized in that a surface passivation of the lithium-coated or -alloyed mouldings is carried out by contacting them with gaseous or liquid coating agents selected from the group consisting of N2, CO2, CO, O2, N2O, NO, NO2, HF, F2, PF3, PFs, PQF3 or liquid coating agents selected from the group of carbonic acid esters; of lithium chelatoborate solutions as solutions in organic solvents, organosulfur compounds, N-containing organic compounds, phosphoric acid, organic phosphorus-containing compounds, fluorine-containing organic and inorganic compounds, partially fluorinated hydrocarbons, Bf 3, LiPF6, LiBF4 or silicon containing compounds.

12. The process according to claim 11, characterized in that the organic solvents are selected from the group consisting of oxygen-containing heterocycles, carbonic acid esters, nitriles, carboxylic acid esters or ketones and the organosulfur compounds are selected from the group consisting of sulfites, sulfones, sultones.

13. The process according to any of claims 1 to 5, characterized in that coatings of metallic lithium on current collecting foils consisting of Cu, Fe, Ni or a carbon-based material are produced as lithium metal mouldings, wherein the layer thickness of the lithium metal mouldings is in the range 2-40 μm.

* * * * *

UNITED STATES PATENT AND TRADEMARK OFFICE
CERTIFICATE OF CORRECTION

| | |
|---|---|
| PATENT NO. | : 12,221,698 B2 |
| APPLICATION NO. | : 18/007607 |
| DATED | : February 11, 2025 |
| INVENTOR(S) | : Wietelmann et al. |

It is certified that error appears in the above-identified patent and that said Letters Patent is hereby corrected as shown below:

In the Claims

Column 9, Claim 10, Line 8, please remove "5" and insert --6--.

Column 9, Claim 10, Lines 8-9, please remove "claims 1 to 9".

Signed and Sealed this
Twenty-fourth Day of June, 2025

Coke Morgan Stewart
*Acting Director of the United States Patent and Trademark Office*